(12) United States Patent
Beard (10) Patent No.: US 10,101,736 B1
(45) Date of Patent: Oct. 16, 2018

(54) SYSTEMS AND METHODS FOR OPEN-LOOP CONTROL OF A BRUSHLESS MOTOR

(71) Applicant: Horizon Hobby, LLC, Champaign, IL (US)

(72) Inventor: Paul Beard, Bigfork, MT (US)

(73) Assignee: Horizon Hobby, LLC, Champaign, IL (US)

( * ) Notice: Subject to any disclaimer, the term of this patent is extended or adjusted under 35 U.S.C. 154(b) by 0 days.

(21) Appl. No.: 14/190,805

(22) Filed: Feb. 26, 2014

(51) Int. Cl.
| | |
|---|---|
| *G05D 1/00* | (2006.01) |
| *G05D 1/08* | (2006.01) |
| *G05D 3/00* | (2006.01) |
| *G06F 3/00* | (2006.01) |
| *G06F 7/00* | (2006.01) |
| *G06F 17/00* | (2006.01) |
| *G05B 24/02* | (2006.01) |
| *B64C 13/16* | (2006.01) |

(52) U.S. Cl.
CPC .............. *G05B 24/02* (2013.01); *B64C 13/16* (2013.01)

(58) Field of Classification Search
USPC ........................................................... 701/44
See application file for complete search history.

(56) References Cited

U.S. PATENT DOCUMENTS

| | | | | |
|---|---|---|---|---|
| 4,860,844 A | * | 8/1989 | O'Neil .................... | B62D 5/003 180/402 |
| 4,982,147 A | * | 1/1991 | Lauw ..................... | H02P 25/024 318/721 |
| 5,023,493 A | * | 6/1991 | Wrzesinski ............... | H02P 7/04 307/10.1 |
| 5,083,077 A | * | 1/1992 | Wallace .................. | H02P 9/007 318/729 |
| 5,239,251 A | * | 8/1993 | Lauw ...................... | H02P 6/005 290/31 |
| 5,304,911 A | * | 4/1994 | Anderson ............... | H02P 23/26 318/729 |
| 5,469,045 A | * | 11/1995 | Dove .................... | H02J 3/1892 323/210 |

(Continued)

FOREIGN PATENT DOCUMENTS

| | | | |
|---|---|---|---|
| EP | 0087812 B1 | * | 8/1987 |
| EP | 1489735 A2 | * | 12/2004 |
| WO | WO 03027789 A1 | * | 4/2003 |

*Primary Examiner* — Jean Paul Cass
(74) *Attorney, Agent, or Firm* — Baker Botts L.L.P.

(57) ABSTRACT

An example method includes receiving data representing a target rotational position of an output shaft of a brushless motor configured to control a rotational position of the output shaft with continuous resolution, determining a plurality of control signals via an algorithm configured for open-loop control of the rotational position of the output shaft, and providing the plurality of control signals to respective input terminals of the brushless motor to cause the brushless motor to rotate the output shaft to the target rotational position. An example system includes a brushless motor comprising an output shaft, and a control module configured to provide a plurality of control signals to respective input terminals of the brushless motor via an algorithm configured for open-loop control of a rotational position of the output shaft. The system is configured to control the rotational position of the output shaft with continuous resolution.

9 Claims, 7 Drawing Sheets

(56) References Cited

U.S. PATENT DOCUMENTS

| | | | |
|---|---|---|---|
| 6,474,603 B1* | 11/2002 | Kinkead | G05D 1/0825 244/17.13 |
| 7,362,070 B2* | 4/2008 | Games | H02P 6/18 318/600 |
| 8,031,495 B2* | 10/2011 | Sachdeva | H02M 7/49 363/132 |
| 8,738,317 B2* | 5/2014 | Petillon | G01C 19/34 702/144 |
| 2003/0057331 A1* | 3/2003 | Kinkead | G05D 1/102 244/194 |
| 2009/0079381 A1* | 3/2009 | Puglisi | H02P 3/24 318/762 |
| 2009/0311089 A1* | 12/2009 | Begin | F03B 11/06 415/104 |
| 2014/0232310 A1* | 8/2014 | Bartalucci | H02P 6/142 318/400.07 |

* cited by examiner

SYSTEMS AND METHODS FOR OPEN-LOOP CONTROL OF A BRUSHLESS MOTOR

FIELD

The disclosed systems and methods relate generally to servomotors and servomotor control systems. Disclosed embodiments relate to servomotors and servomotor control systems for radio-controlled (RC) vehicles.

BACKGROUND

A servomotor is a rotary actuator comprising a rotational shaft, a motor to rotate the shaft, and a sensor to detect the position of the shaft. Servomotors are used in a variety of applications, including applications related to radio-controlled (RC) vehicles. For example, servomotors can be used to control steering mechanisms for (i) RC cars and trucks (turning wheels right or left), (ii) RC planes (positioning wing flaps and rudders), (iii) RC helicopters (positioning swash-plates and tail rudders), and (iv) other similar RC vehicle applications.

In operation, a servomotor receives a control signal that represents a desired rotational position of the shaft. The control signal may be analog or digital depending upon the design of the servomotor. In response to the control signal, the servomotor applies power to the motor to rotate the shaft to the desired position. The shaft typically rotates about +/−60° (120° total) around an axis of rotation, but the actual range of rotation can vary depending upon the design of the servomotor and its intended application. The sensor (e.g., a potentiometer or similar sensor) detects the actual rotational position of the shaft which can be fed back through a control loop for setting the rotational position of the servomotor shaft.

SUMMARY

When using motors to control RC vehicles, it is desirable to have the ability to rapidly and accurately rotate the motor shaft from one rotational position to a next rotational position while eliminating or at least substantially minimizing "over steer" in connection with transitioning from one rotational position to the next.

Similarly, it is also desirable to have the ability to hold the motor shaft firmly and precisely in a desired rotational position, which can be challenging when the mechanisms attached to the motor (e.g., wheel steering mechanisms, helicopter swashplates, plane wing flaps, plane/helicopter/boat rudders, etc.) are subjected to comparatively strong countervailing physical forces that tend to move the motor shaft away from the desired rotational position.

The disclosed motor control systems and methods are designed to rotate the motor shaft rapidly and accurately from one rotational position to a next rotational position, eliminate or at least substantially minimize "over steer" in connection with transitioning from one shaft position to the next, and firmly hold the motor shaft in a fixed or substantially fixed rotational position in the presence of comparatively strong countervailing forces that would tend to move the motor shaft from its desired rotational position in the absence of a firm rotational position holding ability.

Some embodiments include a brushless motor and a control module configured to control a rotational position of an output shaft of the brushless motor. The control module is configured to provide a plurality of control signals to respective input terminals of the brushless motor via an algorithm configured for open-loop control of the rotational position of the output shaft. The brushless motor and the control module are configured to control the rotational position of the output shaft with continuous resolution.

An example method includes receiving data representing a target rotational position of an output shaft of a brushless motor configured to control a rotational position of the output shaft with continuous resolution. The method further includes determining a plurality of control signals via an algorithm configured for open-loop control of the rotational position of the output shaft. The method further includes providing the plurality of control signals to respective input terminals of the brushless motor to cause the brushless motor to rotate the output shaft to the target rotational position.

Another embodiment includes a method for using a brushless motor to control the attitude of an aircraft. In an example, a control module receives data representing a measured attitude of the aircraft. The brushless motor is configured to rotate an output shaft to move a control surface of the aircraft to change the attitude of the aircraft. The control module may also receive data representing a desired attitude of the aircraft and determine a plurality of control signals via an algorithm that is open-loop with respect to the rotational position of the output shaft. The control module may also provide the plurality of control signals to respective input terminals of the brushless motor which may cause the output shaft to rotate toward a target rotational position to move the control surface of the aircraft, thereby causing the attitude of the aircraft to converge toward the desired attitude.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

The following detailed description includes references to the accompanying figures. In the figures, similar symbols typically identify similar components, unless context dictates otherwise. The example embodiments described herein are not meant to be limiting. Other embodiments may be utilized, and other changes may be made, without departing from the scope of the subject matter presented herein. It will be readily understood that the aspects of the present disclosure, as generally described herein and illustrated in the figures can be arranged, substituted, combined, separated, and designed in a wide variety of different configurations, all of which are contemplated herein.

Figure 1A:
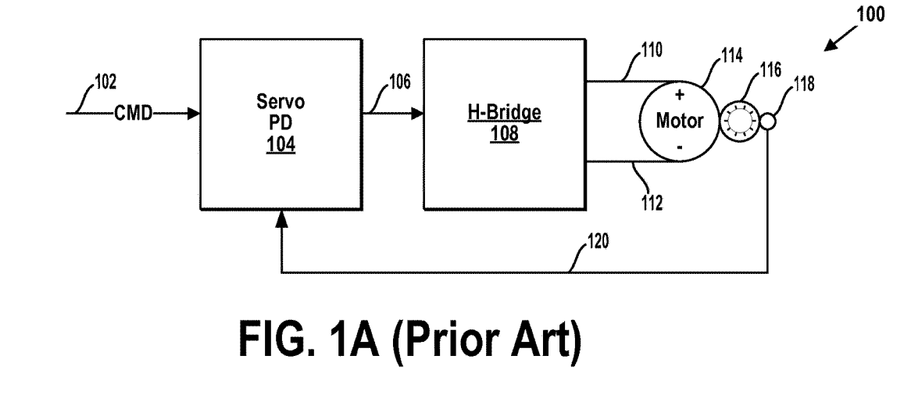
FIG. 1A illustrates an example conventional geared servomotor control system.

FIG. 1A illustrates an example conventional geared servomotor control system 100. FIG. 1A also depicts a position command signal 102 (CMD), a servo PD controller 104, a controller output signal 106, an H-bridge 108, a positive motor input terminal 110, a negative motor input terminal 112, a motor 114, gears 116, a position sensor 118, and a position feedback signal 120.

A control transmitter (not shown) transmits the position command signal 102 to the servo PD controller 104. The position command signal 102 may take the form of a radio frequency (RF) signal. For example, a user may manipulate the control transmitter to transmit a position command signal 102 indicating to the servo PD controller 104 to provide a controller output signal 106 that causes the output shaft of the motor 114 to move to a rotational position of +20° for example.

The servo PD controller 104 may receive (via an RF antenna etc.) the position command signal 102 and compare it to the position feedback signal 120 using a proportional/derivative algorithm. For example, a typical servo PD controller 104 may produce a controller output signal "p(t)" (106) based on constants $K_p$ and $K_D$, a rate of change of the actual rotational position of the output shaft of the motor 114, and an error signal $\Delta\theta$.

$$p(t) = K_p \Delta\theta - K_D \frac{d\theta}{dt} \qquad \text{Equation 1}$$

The error signal $\Delta\theta$ may be equal to the position command signal 102 minus the position feedback signal 120. Conceptually, the error signal represents a difference between a desired rotational position of the output shaft and an actual rotational position of the output shaft.

The controller output signal 106 is provided to the H-bridge 108 (see also FIG. 2A and accompanying description below). The H-bridge 108 may be configured to apply the controller output signal 106 to the motor 114 via the positive input terminal 110 and the negative input terminal 112, and also to selectively reverse the polarity of the signal. The positive input terminal 110 and the negative input terminal 112 may be respectively connected to opposite ends of a winding of an electromagnet that inductively drives the output shaft of the motor 114. In this way, the controller output signal 106 is applied, either with its original or reversed polarity, to the motor 114. The ability to reverse the polarity of the signal applied to motor 114 allows the system to move the output shaft of motor 114 in either rotational direction.

Figure 2A:
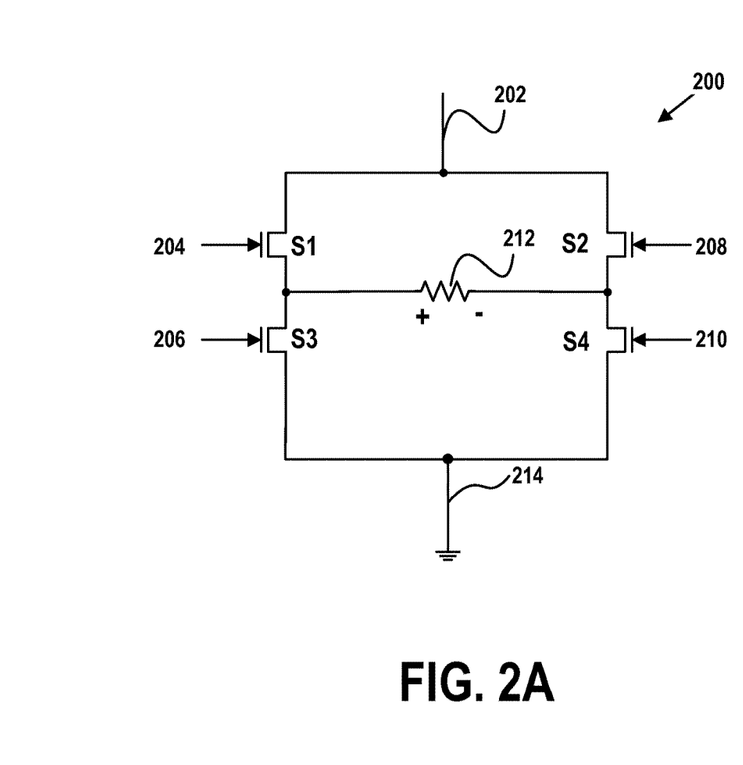
FIG. 2A illustrates an example H-bridge used in some embodiments.

FIG. 2A illustrates an example H-bridge 200, including an input terminal 202, control signals 204, 206, 208, and 210, a load 212, and a ground 214. A power signal (such as the controller output signal 106) may be applied to the input terminal 202, while the control signals 204, 206, 208 and 210 are respectively applied to gates of transistors S1-S4. In some embodiments, the servo PD controller 104 (depicted in FIG. 1A) may provide the power signal and the control signals 204, 206, 208 and 210. The power signal determines a magnitude of current that is supplied to the load 212 (e.g. the motor 114 depicted in FIG. 1A), while control signals 204, 206, 208 and 210 determine the respective states of transistors S1-S4, which in turn determine the polarity of current supplied to the load 212. Transistors S1-S4 may be configured not to conduct current (i.e. an open state) when a logic low control signal is provided, and be configured to conduct current (i.e. a closed state) when a logic high signal is provided. A low signal may correspond to approximately 0 volts and a high signal may correspond to approximately 5 volts, however other values could be used as well. In other embodiments, the relationship between transistor states and high or low control signals may be reversed. Typically, the control signal 204 will be the logical inverse of the control signal 206 and the control signal 208 will be the logical inverse of the control signal 210. Other examples are possible as well.

For example, when the control signals 204 and 210 are high and the control signals 206 and 208 are low, the power signal current flows from the input terminal 202, through transistor S1, through the load 212, and through transistor S4 to the ground 214. If the load 212 is a motor, the H-bridge in the above-described configuration may tend to cause clockwise rotation of the motor. In another example, the control signals 204 and 210 may be low and the control signals 206 and 208 may be high. This configuration of the H-bridge may tend to cause counterclockwise rotation of the motor. In another example, rotation of the motor may be halted by setting the control signals 204 and 208 high while setting the control signals 206 and 210 low (or vice versa).

Referring back to FIG. 1A, the motor 114 may be mechanically coupled to a control mechanism of a vehicle via gears 116. Gears 116 may increase or decrease an amount of torque applied to the control mechanism at a given rotational speed of the motor 114 or may reverse the direction of the torque.

The position sensor 118 may be a potentiometer, hall-effect sensor, or another device configured to sense the actual rotational position of the output shaft of the motor 114. The position sensor 118 may continuously provide a position feedback signal 120 to the servo PD controller 104, which may compare the position command signal 102 and the position feedback signal 120, and adjust the controller output signal 106 accordingly.

Figure 1B:
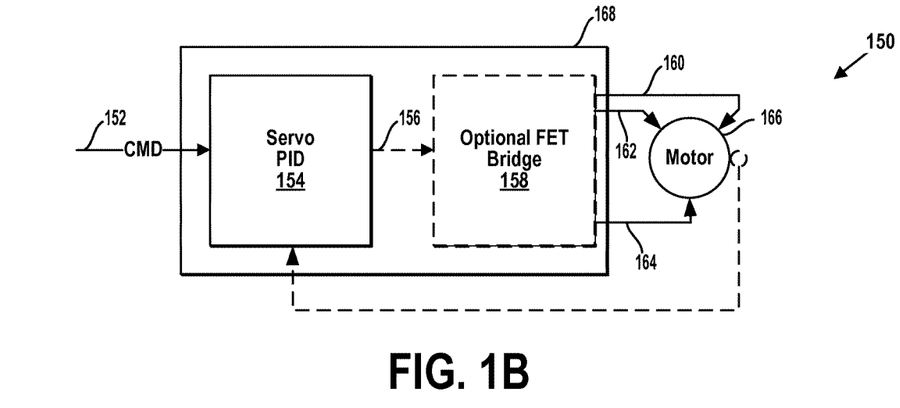
FIG. 1B illustrates an example open-loop motor control system used in some embodiments.

FIG. 1B illustrates an example open-loop motor control system 150. Referring to FIG. 1A, note that the position sensor 118 and the position feedback signal 120 are depicted as optional (dashed lines) in FIG. 1B. Also, gears 116 are omitted in FIG. 1B, meaning that the motor 166 is configured to control a control surface of a boat or aircraft, or a steering mechanism of a car, via a direct drive mechanism. FIG. 1B also depicts a position command signal 152 (CMD), a PID controller 154, a controller output signal(s) 156, a FET bridge 158 (optional), motor input terminals 160, 162, and 164, a brushless motor 166, and a control module 168.

Corresponding elements of the open-loop motor control system 150 provide functionality similar to that of the conventional geared servomotor control system 100, depicted in FIG. 1A. However, there are some differences.

Figure 4:
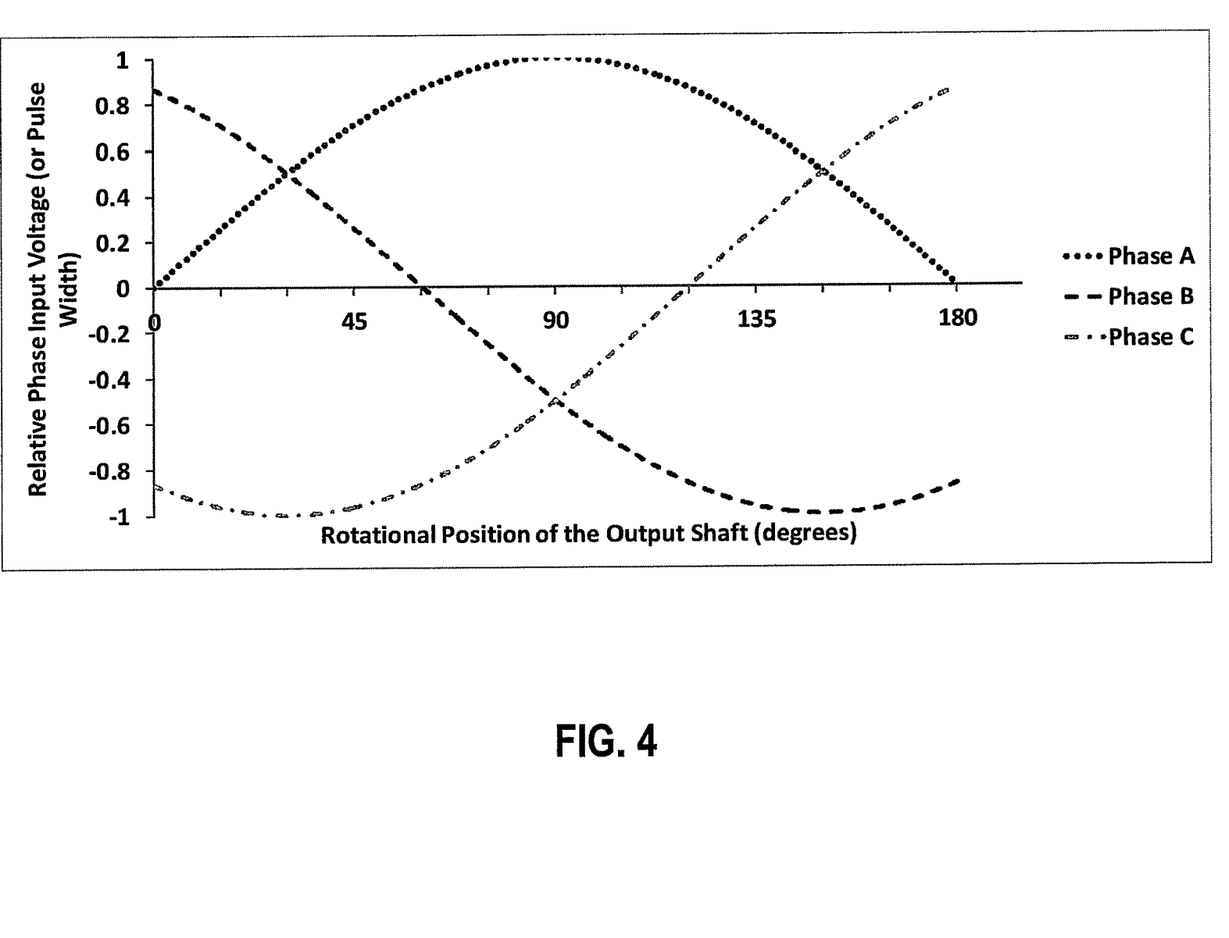
FIG. 4 depicts an example relationship between a rotational position of an output shaft and relative magnitudes and polarities of control signals applied to input terminals of a motor, according to some embodiments.

In some embodiments, the PID controller 154 is configured to control the brushless motor 166 without receiving a position feedback signal. In such embodiments, the PID controller 154 simply receives a position command signal 152 and determines a corresponding controller output signal(s) 156. (A relationship between the rotational position of the output shaft of the brushless motor 166 and control signals provided to the motor 166 is depicted in FIG. 4 and described below.)

Figure 2B:
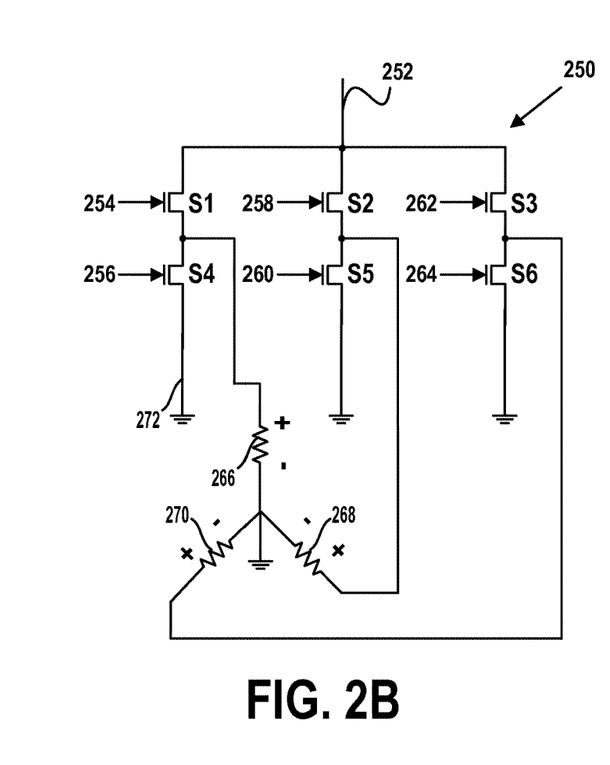
FIG. 2B illustrates an example FET bridge used in some embodiments.

Controller output signals 156 may be provided to the FET bridge 158, which is illustrated at FIG. 2B. FIG. 2B also includes an input terminal 252, control signals 254, 256, 258, 260, 262, and 264, loads 266, 268, and 270, and a ground 272. (The loads 266, 268, and 270 are shown in a wye configuration but could be arranged in an equivalent delta configuration.) A power signal provided by a controller (or a separate power source) is applied across the input terminal 252 and the ground 272. Control signals 254, 256, 258, 260, 262, and 264 may be respectively applied by a controller to gates of transistors S1-S6 as shown. Generally, the control signal 254 will be the logical inverse of the control signal 256. The control signals 258 and 260, and 262 and 264 will generally have the same relationship as well. The control signals may be pulse width modulated signals that determine an average voltage across loads 266, 268 and 270.

For example, the control signal 254 may be high and the control signal 256 may be low, causing transistor S1 to conduct current and transistor S4 to block current, thereby providing the power signal to the load 266. If the control signals 254 and 256 are respectively inverted, a current path between the ground 272 and the load 266 is created, and the power signal is no longer applied to the load 266. The control signals 258 and 260 selectively provide the power signal to the load 268 in the same way. The same also applies to control signals 262 and 264 and the load 270. In this way, the power signal can be pulse width modulated and provided to the loads 266, 268, and 270. By varying the relative amount of time the power signal is provided to each load 266, 268, and 270, independent time-average voltages are provided for each load. In the configuration shown in FIG. 2B, all three loads 266, 268, and 270 may be provided the same power signal for varying amounts of time. H-bridges 200 (depicted in FIG. 2A) may also make up part of the FET bridge 158. For example, an H-bridge 200 may be connected in series with each load 266, 268, and 270 to independently reverse the polarity of the power signal provided to each load as needed.

Referring back to FIG. 1B, whether the optional FET bridge 158 is used or not, control signals are applied to the motor input terminals 160, 162, and 164 by the control module 168. In some embodiments, the control module 168 is simply is the PID controller 154, while in other embodiments the control module 168 also includes the FET bridge 158. In some embodiments, the FET bridge 158 may include one or more H-bridges (as depicted in FIG. 2A). The H-bridges may be connected in series with the motor input terminals 160, 162, 164. When the FET bridge 158 includes H-bridges, the FET bridge may be configured to receive control signals from the PID controller 154, reverse the polarity and/or pulse-width modulate the control signals, and provide the altered control signals to motor input terminals 160, 162, 164.

In other embodiments where the control module 168 includes only the PID controller 154, the PID controller may be configured to provide multiple control signals, with the optional ability to provide pulse width modulation, reversed polarity functionality, and negative voltage signals.

The control module 168 may provide control signals to the brushless motor 166 via the motor input terminals 160, 162, and 164. The brushless motor 166 may be a 3-phase 6-pole brushless motor, but other possibilities exist. The motor input terminals 160, 162, and 164 may each correspond to pairs of electromagnet windings labeled $V_A$, $V_B$, and $V_C$, referring to FIG. 3. The brushless motor 166 may have the pairs of electromagnet windings internally wired so that externally the brushless motor 166 has only the three motor input terminals 160, 162, 164 for connection to the control module 168.

Figure 3:
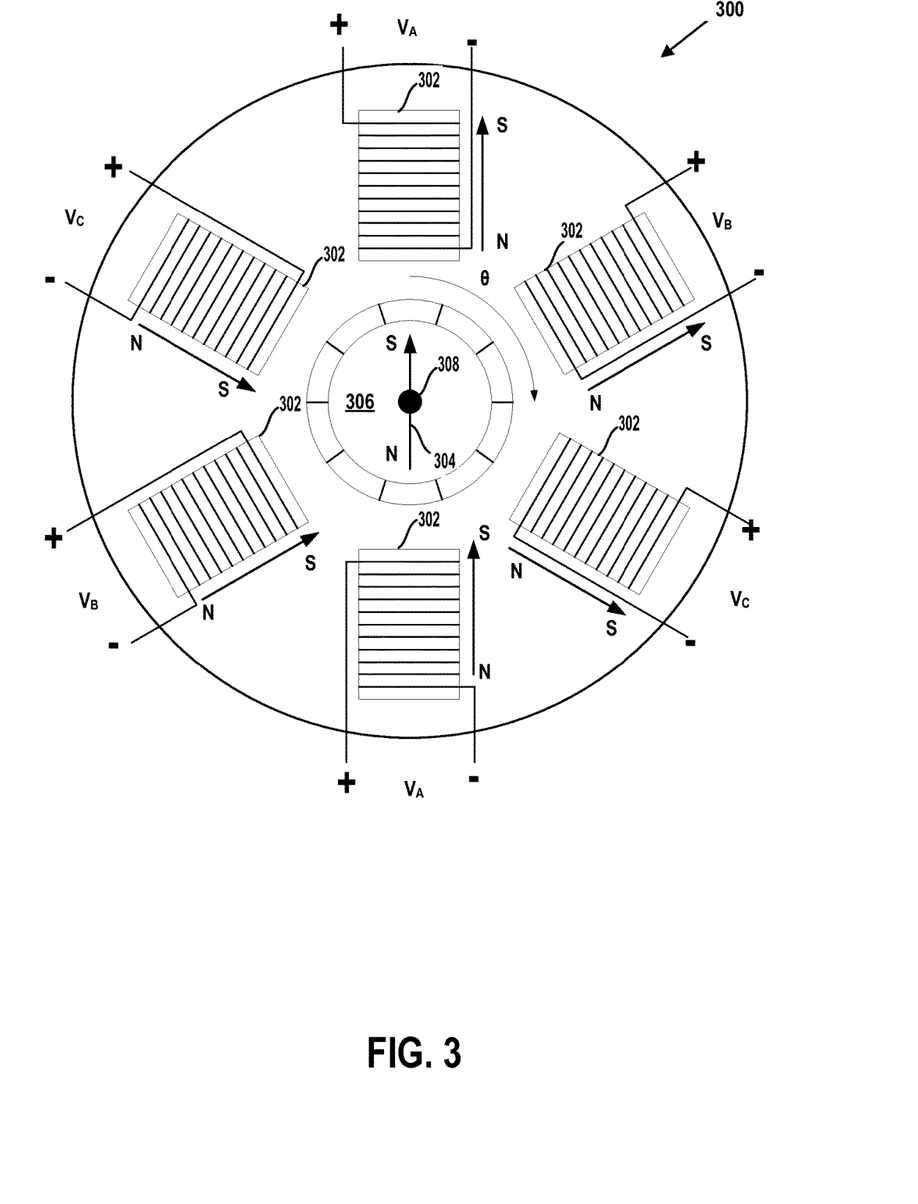
FIG. 3 depicts an example brushless motor used in some embodiments.

FIG. 3 depicts an example brushless motor 300, electromagnets 302, a magnetic dipole 304, a rotor 306, and an output shaft 308. Control signals may be provided (e.g. from the control module 168 of FIG. 1B) to respective input terminals $V_A$, $V_B$, and $V_C$, which may cause the electromagnets 302 to provide a net magnetic field based on the control signals provided to input terminals $V_A$, $V_B$, and $V_C$. For example, if three AC control signals of equal magnitude and relative phase of 120° are provided to the input terminals, the net magnetic field may rotate at a frequency substantially equal to that of the control signals.

The magnetic dipole 304 may represent a single permanent magnet, or the rotor 306 may include several permanent magnets having a net magnetic moment represented by the magnetic dipole 304. The net magnetic field caused by the electromagnets 302 may cause the magnetic dipole 304 to align with the net magnetic field, causing the rotor 306 to rotate. The output shaft 308 may be coupled to rotate along with the rotor 306. In this way, varying the control signals applied to input terminals $V_A$, $V_B$, and $V_C$ can cause the output shaft 308 to rotate to any desired rotational position. The output shaft 308 may be mechanically coupled to a control surface of an aircraft or boat, or a steering mechanism of car. By providing specific control signals to the brushless motor 300, the motor may be configured to rotate the output shaft 308 to any rotational position with continuous resolution and, in some embodiments, without positional feedback of the output shaft 308.

FIG. 4 depicts an example relationship between a rotational position of an output shaft (such as the output shaft 308 depicted in FIG. 3) and the relative magnitudes and polarities of control signals applied to input terminals of a motor associated with the output shaft. Referring to FIG. 3, in this example "Phase A" may refer to a control signal applied to input terminal "$V_A$," "Phase B" may refer to a control signal applied to input terminal "$V_B$," and "Phase C" may refer to a control signal applied to input terminal "$V_C$." Although in FIG. 4 the rotational range of the output shaft is characterized from 0° to 180°, the relationship disclosed is periodic with respect to rotational position, and can easily be extrapolated to other position ranges, such as −180° to 0°. It should also be noted that the definition of a rotational position of 0° is completely arbitrary.

As an example, a user may wish to rotate the output shaft to a rotational position of 90°. This may correspond to $V_A$=x and $V_B$=−0.5x=$V_C$, where "x" is an arbitrary voltage magnitude. A larger "x" may cause the output shaft to rotate to the desired position faster (or with more torque) and may need to be large enough to overcome frictional limitations of the motor, but otherwise any voltage "x" will suffice. The voltage "x" may correspond to the power signal applied across the input terminal 202 and the ground 214 of the H-bridge 200 of FIG. 2A, or across the input terminal 252 and the ground 272 of the FET bridge 250 of FIG. 2B. The voltage "x" may also be directly applied to the input terminal "$V_A$" of FIG. 3. Likewise the voltage "−0.5x" may also be applied to H-bridges or FET bridges corresponding to input terminals $V_B$ and $V_C$, or directly to those respective terminals. A specific configuration may depend on the capabilities of the PID controller 154 of FIG. 1B.

For example, the power signal may be applied to input terminal 252 of the FET bridge 250 and the control signals may be modulated in response to control signals 254, 256, 258, 260, 262, and 264 (see FIG. 2B). Referring to FIG. 2B and FIG. 3, for example, the load 266 may represent electromagnets 302 corresponding to the input terminal $V_A$, the load 268 may represent electromagnets 302 corresponding to the input terminal $V_B$, and the load 270 may represent electromagnets 302 corresponding to the input terminal $V_C$. To apply a negative voltage to an input terminal, a positive power signal may be inverted by using the H-bridge 200 of FIG. 2A. Otherwise, the PID controller 154 of FIG. 1B, may directly apply ranges and pulses of voltage to input terminals $V_A$, $V_B$, and $V_C$ of the motor.

In another example, the target rotational position of the output shaft may be 30°. This may correspond to $V_C=-x$ and $V_A=0.5x=V_B$ (see FIG. 4). The PID controller 154 may apply these signals directly to the input terminals $V_A$, $V_B$, and $V_C$, or the voltage "x" may be applied as a power signal to the input terminal 202 of the H-Bridge 200 of FIG. 2A or may be applied to the input terminal 252 of the FET bridge 250 of FIG. 2B. For example, to yield $V_C=-x$, the H-bridge 200 may be used to reverse the polarity of the voltage "x" applied to input terminal 202. To yield $V_A=0.5x=V_B$, the power signal "x" may be applied to input terminal 202 of the H-bridge 200, although control signals would be provided at gates of transistors S1-S4 that preserve the positive polarity. The H-bridge circuit 200 may be connected in series with the load 266 of the FET bridge 250 of FIG. 2B. Control signals may be provided at gates of transistors S1 and S4 of FET bridge 250 that cause the time average voltage across the load 266 to be 0.5x.

Figure 5A:
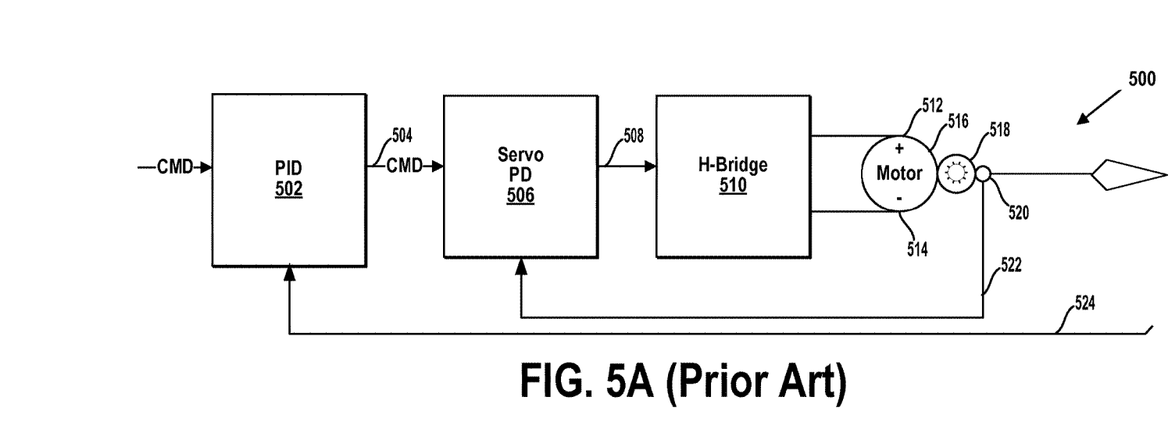
FIG. 5A depicts an example conventional motor control system.

FIG. 5A depicts an example conventional motor control system 500 for controlling a control surface of an aircraft. The conventional control system 500 includes a PID controller 502, a first controller output signal 504, a servo PD controller 506, a second controller output signal 508, an H-bridge 510, a positive motor input terminal 512, a negative motor input terminal 514, a motor 516, gears 518, a position sensor 520, a position feedback signal 522, and an attitude feedback signal 524.

The PID controller 502 may receive an attitude command indicating a desired attitude of the aircraft (e.g. yaw, pitch, and roll angles relative to a reference attitude). The PID controller 502 may also receive the attitude feedback signal 524 that represents an actual attitude measurement of the aircraft, which may be determined from one or more gyroscopes and accelerometers. The PID controller 502 may generate a first controller output signal 504 to correct the attitude of the aircraft by adjusting a position of a motor output shaft that moves a control surface of the aircraft (i.e. a rudder, an elevator, or ailerons). The PID controller 502 may generate the first controller output signal 504 based on equation 2.

$$p(t) = K_P \Delta\theta - K_D \frac{d\theta}{dt} + K_I \int \Delta\theta \, dt \qquad \text{Equation 2}$$

The first controller output signal 504 may represent a desired rotational position of an output shaft of motor 516 that corresponds with moving the attitude of the aircraft toward the desired attitude.

The servo PD controller 506, the second controller output signal 508, the H-bridge 510, the positive motor input terminal 512, the negative motor input terminal 514, the motor 516, gears 518, the position sensor 520, and the position feedback signal 522 may function in substantially the same way as corresponding components depicted in FIG. 1A and described above.

An attitude sensor (e.g. one or more gyroscopes and accelerometers or an inertial measurement unit or IMU) (not shown) may provide the attitude feedback signal 524, which represents a measured attitude of the aircraft (i.e. yaw, pitch, and roll angles relative to a reference attitude.) In some embodiments, the IMU may measure and provide data about linear acceleration of the aircraft or a rate of attitude change of the aircraft. The attitude feedback signal 524 may be provided to the PID controller 502 so that the PID controller 502 may compare the desired attitude and the measured attitude of the aircraft and provide an appropriate first controller output signal 504 to the servo PD controller 506.

Figure 5B:
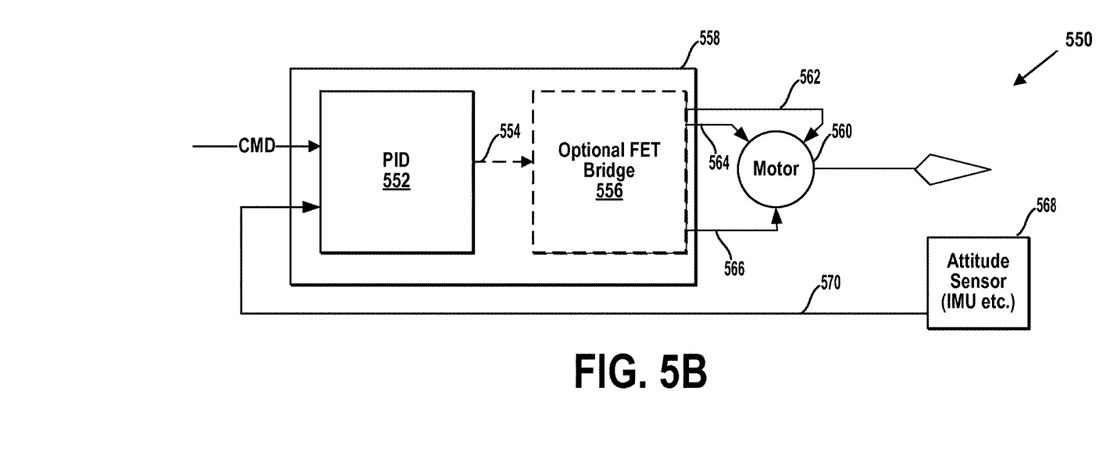
FIG. 5B illustrates an example motor control system used in some embodiments.

FIG. 5B illustrates an example motor control system 550 according to some embodiments. The motor control system 550 is designed to control a control surface of an aircraft with attitude feedback, but without requiring feedback related to the rotational position of an output shaft of a motor (e.g., position feedback 522 shown in FIG. 5A). FIG. 5B also depicts a PID controller 552, a controller output signal(s) 554, an (optional) FET Bridge 556, a control module 558, a brushless motor 560, motor input terminals 562, 564, and 566, an attitude sensor 568, and an attitude feedback signal 570.

The PID controller 552 may receive an attitude command signal from a control transmitter (not shown). The attitude command signal may represent a desired attitude of the aircraft (e.g. yaw due south, pitch 10° down, roll 10° right). The PID controller 552 receives the attitude feedback signal 570 from the attitude sensor 568, compares the two signals, and generates the appropriate controller output signal(s) 554. The controller output signal(s) 554 may represent a desired rotational position of the output shaft of the motor 560 designed to move a control surface of the aircraft to change the measured attitude of the aircraft toward the desired attitude. In operation, moving the output shaft of the motor 560 may be accomplished according in substantially the same way as described herein with reference to FIGS. 1B, 2A, 2B, 3, and 4. However, rather than controlling the position of the output shaft based a direct rotational position input, the motor control system 5550 controls the position of the output shaft based on an attitude input that can be converted into a rotational position input based on the particular aircraft configuration.

Figure 6:
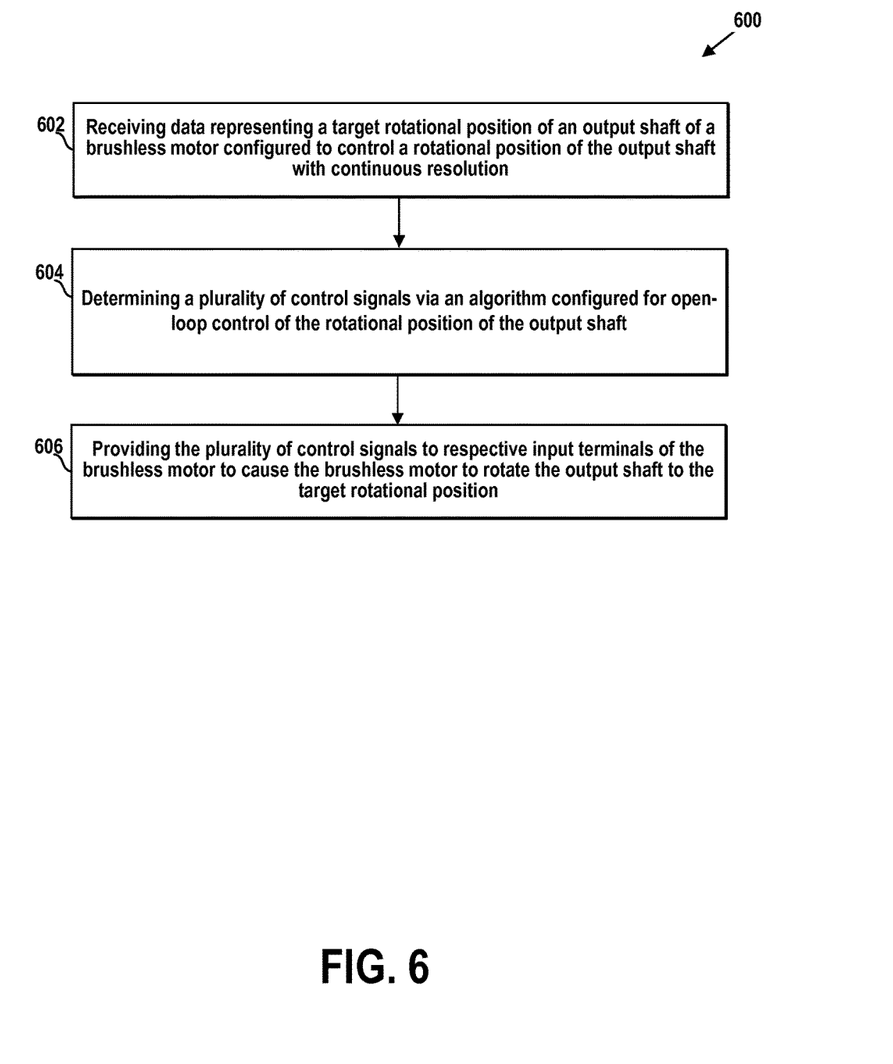
FIG. 6 illustrates an example method practiced by some embodiments.

FIG. 6 illustrates an example method 600 for open-loop and continuous resolution control of a rotational position of an output shaft of a brushless motor. The method may be performed by the open-loop control system 150 depicted in FIG. 1B.

Method 600 may include one or more operations, functions, or actions as illustrated by one or more blocks of 602-606. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

At block 602, the method includes receiving data representing a target rotational position of an output shaft of a brushless motor configured to control a rotational position of the output shaft with continuous resolution. For example, the control module 168 (depicted in FIG. 1B) may receive a positional command representing the target rotational position from a control transmitter manipulated by a user.

At block 604, the method includes determining a plurality of control signals via an algorithm configured for open-loop control of the rotational position of the output shaft. For example, the control module may determine the control signals based on the relationship between voltages applied to input terminals of the motor and the rotational position of the output shaft (e.g., as depicted in FIG. 4). In this way, the control module may determine a magnitude (such as 0.2, 1, or 5 volts) and/or a polarity (positive or negative) of a control signal based on a sinusoidal relationship between the magnitude and polarity of the control signal and the target rotational position of the output shaft. The relationship may be defined by equation 3.

$$K[\sin(\theta+\varphi)]=V \qquad \text{Equation 3:}$$

In equation 3, K represents a constant, θ represents a rotational position of the output shaft with respect to a reference rotational position of the output shaft, φ represents a phase constant, and V represents the magnitude and the polarity of the control signal.

Three control signals may be determined based on this relationship and/or equation. A first control signal may be determined by equation 4(a).

$$K[\sin\theta]=V_A \qquad \text{Equation 4(a):}$$

In equation 4(a), K represents a constant, θ represents a rotational position of the output shaft with respect to a reference rotational position of the output shaft, and $V_A$ represents the magnitude and the polarity of the first control signal.

A second control signal may be determined by equation 4(b).

$$K[\sin(\theta-120°)]=V_B \qquad \text{Equation 4(b):}$$

In equation 4(b), K represents a constant, θ represents a rotational position of the output shaft with respect to a reference rotational position of the output shaft, and $V_B$ represents the magnitude and the polarity of the second control signal.

Finally, a third control signal may be determined by equation 4(c).

$$K[\sin(\theta-240°)]=V_C \qquad \text{Equation 4(c):}$$

In equation 4(c), K represents a constant, θ represents a rotational position of the output shaft with respect to a reference rotational position of the output shaft, and $V_C$ represents the magnitude and the polarity of the third control signal.

In other embodiments, the method may also include determining a pulse width of a control signal of the plurality of control signals based on a sinusoidal relationship between the pulse width of the control signal and the target rotational position of the output shaft. For example, referring to FIG. 4, a desired output shaft position of 90° may correspond to $PW_A$=x and $PW_B$=0.5x=$PW_C$, where "x" is an arbitrary pulse width and $PW_A$, $PW_B$, and $PW_C$ respectively represent pulse widths corresponding to input terminals $V_A$, $V_B$, and $V_C$ of FIG. 3, or equivalently loads 266, 268, and 270 of FIG. 2B. To provide a pulse modulated power signal to the input terminals $V_A$, $V_B$, and $V_C$ or to loads 266, 268, and 270, pulse modulated control signals may be provided to gates of transistors S1-S3 of the FET bridge 250, respectively. The logical inverse of the signals respectively provided to gates of transistors S1-S3 may be provided to gates of transistors S4-S6. For example, a current path will be completed between the input terminal 252 and the load 266 when a logical high signal (e.g. 5 volts) is provided to gate 254 and a logical low signal (e.g. 0 volts) is applied to gate 256. Alternatively, the voltage across the load 266 will be zero when logic low is applied to gate 254 and logical high is applied to gate 256. Servo PID 154 may operate such that the signal provided to gate 254 is always the logical inverse of the signal provided to gate 256. By increasing the pulse width corresponding to the signal applied to gate 254, a higher time-average voltage will be applied to the load 266.

The bridge circuit 200 may also be used to reverse a polarity of a signal applied to loads 266, 268, and 270. For example, the FET bridge 158 of FIG. 1B may include an H-bridge connected in series with the input terminals 160, 162, and 164 of motor 166. For example, if a pulse width of 0.5x is to be applied with a negative polarity to the load 266, the servo PID 154 may provide a pair of control signals with pulse width 0.5x to gates of transistors S1 and S4 and provide another set of control signals to gates of transistors S1-S4 of FIG. 2A such that the current provided to load 212/266 is provided with negative polarity. In this case, logic high signals would be provided to gates of transistors S2 and S3, while logic low would be provided to gates of transistors S1 and S4. In this way, varying the control signals provided to the H-bridge 200 or FET bridge 250 may change the state of the respective circuits.

At block 606, the method includes providing the plurality of control signals to respective input terminals of the brushless motor to cause the brushless motor to rotate the output shaft to the target rotational position. For example, the control module 168 may provide the control signals to the motor input terminals 160, 162, 164, depicted in FIG. 1B.

Figure 7:
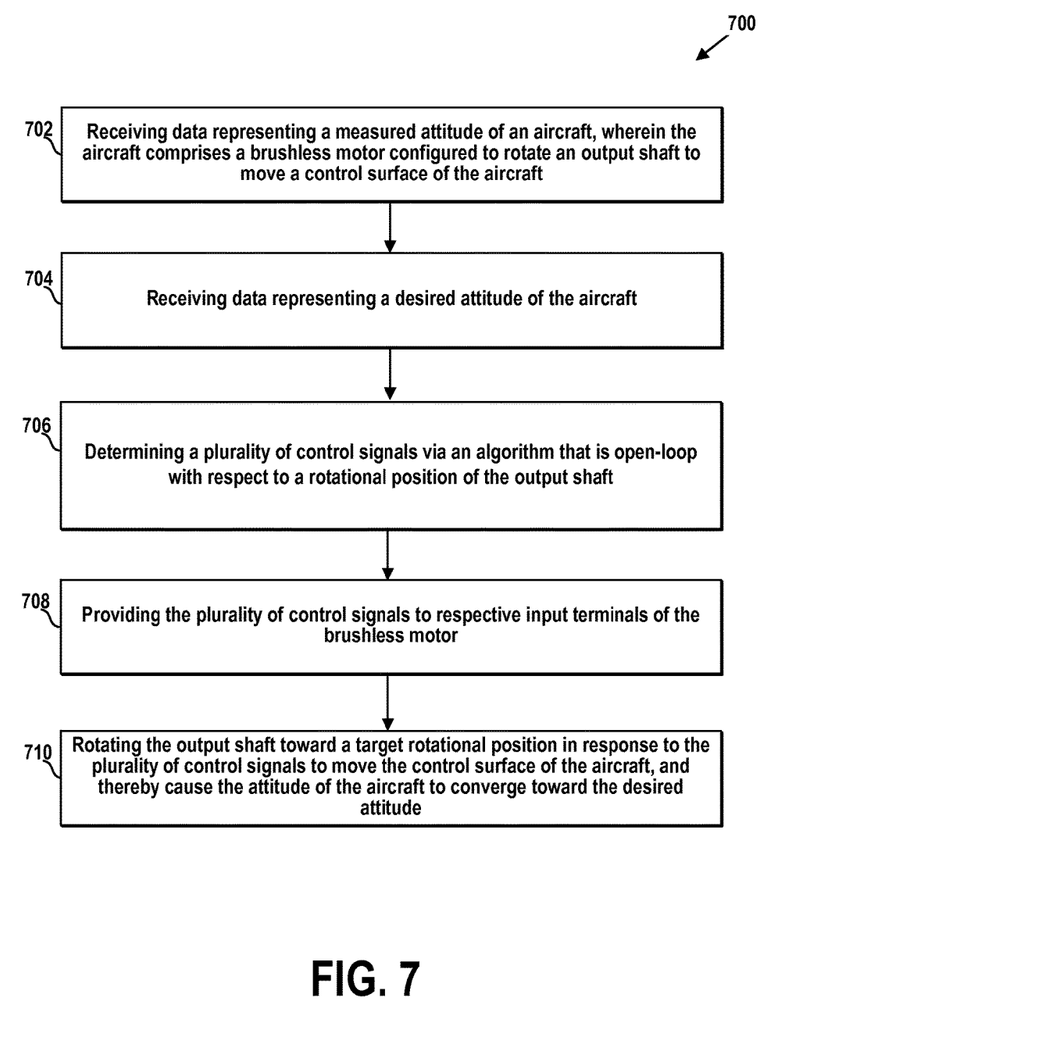
FIG. 7 illustrates an example method practiced by some embodiments.

FIG. 7 illustrates an example method 700 for controlling a control surface of an aircraft with attitude feedback, but without requiring feedback related to the rotational position of an output shaft of a motor. The method may be performed by the motor control system 550 depicted in FIG. 5B.

Method 700 may include one or more operations, functions, or actions as illustrated by one or more blocks of 702-710. Although the blocks are illustrated in a sequential order, these blocks may in some instances be performed in parallel, and/or in a different order than those described herein. Also, the various blocks may be combined into fewer blocks, divided into additional blocks, and/or removed based on the desired implementation.

At block 702, the method includes receiving data representing a measured attitude of an aircraft that includes a brushless motor configured to rotate an output shaft to move a control surface of the aircraft. The control module 558 or the PID controller 552 may receive the data from the IMU 568.

At block 704, the method includes receiving data representing a desired attitude of the aircraft. In operation, the control module 558 or the PID controller 552 may receive the data representing the desired attitude from a control transmitter via an RF communications link.

At block 706, the method includes determining a plurality of control signals via an algorithm that is open-loop with respect to a rotational position of the output shaft. The plurality of control signals may be determined based on a sinusoidal relationship between the magnitude and polarity of the control signal, and a rotational position of the output shaft. In other embodiments, a pulse width of a control signal may be determined based on a sinusoidal relationship between the pulse width of the control signal and the target rotational position of the output shaft. Further, the pulse width may be determined along with a state of a bridge circuit, where the pulse width of the control signal determines a time-average voltage across a winding of the brushless motor and the state of the bridge circuit determines a polarity of the voltage across the winding of the brushless motor.

At block 708, the method includes providing the plurality of control signals to respective input terminals of the brushless motor. For example, the control module 558 may provide the control signals to the motor input terminals 562, 564, and 566, depicted in FIG. 5B.

At block 710, the method includes rotating the output shaft toward a target rotational position in response to the plurality of control signals to move the control surface of the aircraft, and thereby cause the attitude of the aircraft to converge toward the desired attitude.

The method may further include determining an attitude error between the measured attitude of the aircraft and the desired attitude of the aircraft. For example, the control module 558 may receive an attitude command from an RF transmitter. The control module 558 may then calculate a position error between the target rotational position of the output shaft and an actual rotational position of the output shaft based on the attitude error. The position error may simply be an angle representing a difference between the actual and target rotational positions of the output shaft. The control module 558 and the motor 560 may then cause rotation of the output shaft toward the target rotational position based on the position error.

While particular aspects and embodiments are disclosed herein, other aspects and embodiments will be apparent to those skilled in the art in view of the foregoing teaching. For example, while the embodiments are described with respect to applications for RC vehicles, the disclosed systems and methods are not so limited. The various aspects and embodiments disclosed herein are for illustration purposes only and are not intended to be limiting, with the true scope and spirit being indicated by the following claims.

What is claimed is:

1. A method comprising:
   receiving data representing a target rotational position of an output shaft of a brushless motor configured to control a rotational position of the output shaft with continuous resolution;
   determining a plurality of control signals corresponding to the target rotational position of the output shaft, wherein determining the plurality of control signals comprises:
      determining a magnitude and a polarity of a control signal of the plurality of control signals based on an equation $K[\sin(\theta+\varphi)]=V$, wherein K represents a constant, $\theta$ represents a rotational position of the output shaft with respect to a reference rotational position of the output shaft, $\varphi$ represents a phase constant, and V represents the magnitude and the polarity of the control signal; and
      determining a pulse width of a control signal of the plurality of control signals and a state of a bridge circuit, wherein the pulse width of the control signal determines a magnitude of a voltage across a winding of the brushless motor and the state of the bridge circuit determines a polarity of the voltage across the winding of the brushless motor;
   rotating the output shaft of the brushless motor to the target rotational position by applying the plurality of control signals to the brushless motor without using a feedback signal from a sensor indicating an actual rotational position of the output shaft; and
   holding the output shaft at the target rotational position by applying a second set of control signals.

2. The method of claim 1, wherein determining the plurality of control signals further comprises:
   determining a magnitude and a polarity of a second control signal of the plurality of control signals based on an equation $K[\sin(\theta-120°)]=V_B$, wherein $V_B$ represents the magnitude and the polarity of the second control signal; and
   determining a magnitude and a polarity of a third control signal of the plurality of control signals based on an equation $K[\sin(\theta-240°)]=V_C$, wherein $V_C$ represents the magnitude and the polarity of the third control signal.

3. The method of claim 1, wherein determining the plurality of control signals comprises:
   determining a pulse width of a second control signal of the plurality of control signals and a state of a second bridge circuit, wherein the pulse width of the second control signal determines a magnitude of a voltage across a second winding of the brushless motor and the state of the second bridge circuit determines a polarity of the voltage across the second winding of the brushless motor; and
   determining a pulse width of a third control signal of the plurality of control signals and a state of a third bridge circuit, wherein the pulse width of the third control signal determines a magnitude of a voltage across a third winding of the brushless motor and the state of the third bridge circuit determines a polarity of the voltage across the third winding of the brushless motor.

4. A system comprising:
   a brushless motor comprising an output shaft; and
   a control module configured to (i) determine a plurality of control signals corresponding to a target rotational position of the output shaft, wherein the control module is configured to determine (a) a magnitude and a polarity of a control signal of the plurality of control signals based on an equation $K[\sin(\theta+\varphi)]=V$, wherein K represents a constant, $\theta$ represents a rotational position of the output shaft with respect to a reference rotational position of the output shaft, $\varphi$ represents a phase constant, and V represents the magnitude and the polarity of the control signal and (b) a pulse width of a control signal of the plurality of control signals and a state of a bridge circuit, wherein the pulse width of the control signal determines a magnitude of a voltage across a winding of the brushless motor and the state of the bridge circuit determines a polarity of the voltage across the winding of the brushless motor, (ii) rotate the output shaft to the target rotational position by applying the plurality of control signals to the brushless motor without using a feedback signal from a sensor indicating an actual rotational position of the output shaft, and (iii) hold the output shaft at the target rotational position by applying a second set of control signals.

5. The system of claim 4, wherein the brushless motor is configured to change at least one of (i) a position of a control surface of an aircraft via the output shaft, (ii) a position of a control surface of a boat via the output shaft, or (iii) a steering position of a car via the output shaft.

6. The system of claim 5, wherein the control surface is coupled to the output shaft via a direct drive mechanism.

7. The system of claim 4, further comprising:
   an inertial measurement unit (IMU) configured to provide the control module with data representing at least one of (i) an acceleration of an aircraft, (ii) a roll, pitch, or yaw of the aircraft, and (iii) a rate of change in the roll, pitch, or yaw of the aircraft.

8. The system of claim 4, wherein the bridge circuit is electrically coupled to a winding of the brushless motor and is configured to change a time-average voltage across the winding.

9. A system comprising:
- an inertial measurement unit configured to measure an attitude of an aircraft, wherein the aircraft comprises a brushless motor configured to rotate an output shaft to move a control surface of the aircraft; and
- control circuitry configured to:
  - receive data representing a desired attitude of the aircraft;
  - determine a plurality of control signals corresponding to a target rotational position of the output shaft, wherein determining the plurality of control signals comprises determining a pulse width of a control signal of the plurality of control signals and a state of a bridge circuit, wherein the pulse width of the control signal determines a magnitude of a voltage across a winding of the brushless motor and the state of the bridge circuit determines a polarity of the voltage across the winding of the brushless motor;
  - rotate the output shaft to the target rotational position by applying the plurality of control signals to the brushless motor without using a feedback signal from a sensor indicating an actual rotational position of the output shaft, and thereby cause the attitude of the aircraft to converge toward the desired attitude;
  - hold the output shaft at the target rotational position by applying a second set of control signals;
  - determine an attitude error between the measured attitude of the aircraft and the desired attitude of the aircraft;
  - calculate a position error between the target rotational position of the output shaft and an actual rotational position of the output shaft based on the attitude error; and
  - rotate the output shaft toward the target rotational position based on the position error.

* * * * *